United States Patent
Mindt

(10) Patent No.: US 11,876,955 B2
(45) Date of Patent: Jan. 16, 2024

(54) METHOD FOR QUALIFICATION OF A CAMERA SYSTEM AND/OR ITS IMAGE/CAMERA SIGNALS

(71) Applicant: Robert Bosch GmbH, Stuttgart (DE)

(72) Inventor: Holger Mindt, Steinheim A. D. Murr (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/822,842

(22) Filed: Aug. 29, 2022

(65) Prior Publication Data
US 2023/0064268 A1 Mar. 2, 2023

(30) Foreign Application Priority Data
Sep. 2, 2021 (DE) .................. 10 2021 209 671.9

(51) Int. Cl.
*H04N 7/18* (2006.01)
*H04N 17/00* (2006.01)
(Continued)

(52) U.S. Cl.
CPC ........ *H04N 17/002* (2013.01); *B60W 60/001* (2020.02); *B60W 2420/42* (2013.01);
(Continued)

(58) Field of Classification Search
CPC ..... H04N 17/002; H04N 7/18; B60W 60/001; B60W 2554/20; B60W 2552/53;
(Continued)

(56) References Cited

U.S. PATENT DOCUMENTS

| | | | |
|---|---|---|---|
| 9,103,671 B1* | 8/2015 | Breed | G01S 13/865 |
| 10,816,993 B1* | 10/2020 | Tran | G06V 20/56 |

(Continued)

FOREIGN PATENT DOCUMENTS

| | | |
|---|---|---|
| DE | 102016013502 A1 | 5/2017 |
| DE | 102016212196 A1 | 1/2018 |

(Continued)

*Primary Examiner* — Trang U Tran
(74) *Attorney, Agent, or Firm* — NORTON ROSE FULBRIGHT US LLP

(57) ABSTRACT

A method for qualification of a camera system and/or its image/camera signals of a partially autonomously or autonomously driving vehicle. Infrastructure information from a vehicle's surroundings is used. The image/camera signal of the camera system is monitored by a monitoring function with regard to at least the following criteria: image/camera signal in recurring, known time windows, sequence of the image/camera signals, corruption of the image/camera signals, signature checking of the camera system. Checking of the image/camera signals using unmoving land markings that are reconciled with a list is carried out and they are checked for a mapping signature. Then the image/camera signals and the infrastructure information contained in the updated map check function are communicated to an evaluation function and merged and compared in a signal fusion unit. Consequently, a qualified image/camera signal is obtained.

10 Claims, 3 Drawing Sheets

(51) Int. Cl.
  *B60W 60/00*   (2020.01)
  *G06V 20/56*   (2022.01)
(52) U.S. Cl.
  CPC ..... *B60W 2552/05* (2020.02); *B60W 2552/50* (2020.02); *B60W 2552/53* (2020.02); *B60W 2554/20* (2020.02); *B60W 2555/60* (2020.02); *G06V 20/56* (2022.01)
(58) Field of Classification Search
  CPC ......... B60W 2555/60; B60W 2552/05; B60W 2552/50; B60W 2420/42; G06V 20/56
  USPC ....................................................... 348/148
  See application file for complete search history.

(56) References Cited

U.S. PATENT DOCUMENTS

| | | | | |
|---|---|---|---|---|
| 11,048,105 | B1* | 6/2021 | Roy | G06F 3/041 |
| 2018/0215392 | A1* | 8/2018 | Kosaka | B60W 50/12 |
| 2021/0403012 | A1* | 12/2021 | Keller | G01S 13/93 |

FOREIGN PATENT DOCUMENTS

| | | |
|---|---|---|
| DE | 102018127059 A1 | 4/2020 |
| DE | 02019130319 A1 | 5/2021 |

* cited by examiner

METHOD FOR QUALIFICATION OF A CAMERA SYSTEM AND/OR ITS IMAGE/CAMERA SIGNALS

CROSS REFERENCE

The present application claims the benefit under 35 U.S.C. § 119 of German Patent Application No. DE 10 2021 209 671.9 filed on Sep. 2, 2021, which is expressly incorporated herein by reference in its entirety.

FIELD

The present invention relates to a method for qualification of a camera system and/or its image/camera signals for a partially autonomously or autonomously driving vehicle using infrastructure information of a vehicle's surroundings. Furthermore, the present invention relates to the use of the method for guiding and supporting an autonomously or partially autonomously driving vehicle by infrastructure information from outside of the vehicle.

BACKGROUND INFORMATION

A partially autonomous or autonomous vehicle (AD vehicle) as a rule is equipped with a CCU (connectivity control unit) or other radio unit. Autonomously or partially autonomously driving vehicles may be supported with the aid of information from outside of the vehicle, for example generated by sensors at a challenging point, or may be safely guided by this information. This information coming from outside of the vehicle is intended to be utilized in particular to support or enable safety-critical functions. Examples of such information originating from the infrastructure are for example critical sections of route, such as building sites or tunnel entrances, other road users in the form of vehicles and pedestrians in the area around the autonomously driving vehicle, furthermore freeway entrance ramps and freeway exit ramps, traffic lights, obstacles, clearance or negotiable zones within an area. In order to conduct information from outside of the vehicle into the vehicle, as a rule direct wireless communication is used, for example DSRC/ITS-G5 or cellular V2X, such as for example LTE-V, 5G-V2X, or the like.

The detection of objects from object lists using external sensors is partly realized with different camera systems. These camera systems usually have no safety requirements and are developed in accordance with the ASIL QM standards or the SIL 0 standard. In order to use signals of such camera systems without safety requirements for a highly automated driving system, camera signals or signal path chains which correspond to safety requirements in accordance with standards ASIL A-D or SIL 1-3 are required. Thus for example it must not occur that, due to a randomly occurring hardware fault or a software error in the camera or in the camera system, suddenly one or more objects can no longer be recognized, a component or the system does not discover the fault or error and therefore calculation continues with unrecognized faulty data, as a result of which it is highly probable that accidents of partially autonomously or autonomously driving vehicles will occur.

The signals of such camera systems must either always be correct or immediately or very rapidly be identified as incorrect. As a result, system reactions can be initiated and data marked as faulty in a timely manner.

German Patent Application No. DE 10 2019 130 319 A1 relates to a method for operating a vehicle that can be driven in an autonomous driving mode. Information from the vehicle environment is ascertained by these detecting sensor devices, and position information describing the actual position of the vehicle is detected using a position detection means. When the motor vehicle is driving in autonomous driving mode qualification of the existing environment situation or the one appearing in the future takes place by a control and processing means with the aid of the continuously detected environment information and the continuously detected position information. The qualification result is compared with one or more comparison results defined individually for the person. On detecting a qualification result corresponding to a comparison result, an information signal indicating the environment situation is output.

SUMMARY

According to the present invention, a method is provided for qualification of a camera system and/or its image/camera signals of a partially autonomously or autonomously driving vehicle using infrastructure information of a vehicle's surroundings.

According to an example embodiment of the present invention, the method includes at least the following method steps:
a) monitoring the image/camera signal of the camera system by a monitoring function with regard to at least the following criteria:
  image/camera signal in recurring, known time windows,
  sequence of the image/camera signals,
  corruption of the image/camera signals,
  signature checking of the camera system;
b) checking the image/camera signals using unmoving land markings that are reconciled with a list (MAP);
c) communicating the image/camera signals according to method step a) and infrastructure information contained [sic; in] the map check function according to method step b) to an evaluation function and comparing these data in a signal fusion unit, and
d) obtaining a qualified image/camera signal after carrying out method step c).

By the method provided according to the present invention, camera systems can be qualified with regard to the safety requirements of ASIL or SIL such that these standards are met and are completely complied with, and image/camera signals of such camera systems are highly qualified for autonomously and partially autonomously driving vehicles.

Advantageously, with the method provided according to the present invention, in recurring known time windows of the image/camera signal that are established according to a), in the case of a correct sequence of the image/camera signals, in the case of non-corrupted image/camera signals and of the correct camera system, a conclusion is drawn that a transmission of an image/camera signal from the correct camera system in the correct sequence at the correct time and with non-corrupted contents has occurred.

In a further advantageous configuration of the method provided according to the present invention, according to method step c) all the image/camera signals and the infrastructure information are evaluated in the evaluation function, and in the event of a fault it is concluded that the image/camera signal is faulty. This makes it possible to prevent calculation being continued with faulty data, and thus scenarios with an accident risk in the case of autonomously or partially autonomously driving vehicles can be avoided.

In a further advantageous configuration of the method provided according to the present invention, according to method step c) the comparison of the infrastructure information with the image/camera signals with regard to visibility of the infrastructure information is carried out in the image/camera signal. This makes possible verification of the image/camera signals with static infrastructure information which as such does not change and accordingly represents fixed points which ought to recur in the image/camera signals of the camera system.

In an advantageous configuration of the method provided according to the present invention, in the case of infrastructure information that is visible in each image/camera signal at matching points it is concluded that the image/camera signal is correct.

Advantageously, in the method provided according to the present invention according to method step c), within the evaluation function the image/camera signals at the time n and at the time n−1 are compared with each other, so that suspicious objects communicated briefly by the image/camera signal can be marked. In particular, a frozen picture of the camera can be recognized by such monitoring (e.g. speed vector comparison and object location comparison at the times n and n−1).

In a further advantageous configuration of the method provided according to the present invention, according to method steps a) and c) the image/camera signals of the camera system are monitored for the occurrence of a frozen image by the evaluation function. This can be represented in a simple manner by the correct sequence of different images.

In a further advantageous configuration of the method provided according to the present invention, upon the comparison according to method step c) being carried out and a shift of the infrastructure information by an identical vector being detected it is concluded that the camera system has been decalibrated. Therefore the method proposed according to the present invention can also be used on the camera system as such or on its settings in relation to calibration.

With the method provided according to the present invention, according to method step b) static information is detected via the map check function. This may be information on gantries, road signs, buildings, tunnels, railroad crossings, bridges, masts, lane markings and the like. These map data are compared with the currently recorded camera image.

Furthermore, the present invention relates to the use of the method for guiding and supporting an autonomously or partially autonomously driving vehicle by infrastructure information from outside of the vehicle at critical points on the route.

Owing to the solution provided according to the present invention in the form of the method, a camera or a camera system without a safety requirement is qualified such that its image/camera signals meet the highest safety requirements. With the method proposed according to the present invention, monitoring of the image/camera signals takes place in such a way that the images or the camera signal sequences are output either as "correct" or as "marked faulty". Image/camera signals qualified as "correct" may be based on further calculations within the partially autonomously or autonomously driving vehicle, whereas image/camera signals ascertained as "marked faulty" are not based on further calculations at all, so any propagation of errors which may occur is stopped in a timely manner. Thus the safety requirements for the transmission of external infrastructure information that is recorded via a non-qualified camera system can be qualified in such a way that the safety requirements in accordance with ASIL A-D or SIL 1-3 are at least observed.

The method provided according to the present invention means that CE cameras without qualification, which do not permit derivation of safety requirements, can be specially qualified. CE products are "consumer electronic" components that are not qualified for use in the "automotive" sector. These inexpensive components can be qualified at a correspondingly higher level by the present invention. In the case of autonomously or partially autonomously driving vehicles, signal chains or object lists that are activated only with ASIL data may not comply with corresponding safety requirements, so signal chains or object lists that are thus not qualified are not sufficient for highly automated driving operation as implemented in a partially autonomous or autonomous vehicle. This state of affairs can be remedied by the method proposed according to the present invention in that a qualification of a CE camera system or its image/camera signals can be raised to a corresponding safety level using an evaluation logic.

Faulty image/camera signals or video signals can be identified and marked accordingly, so these further calculations are not used as a basis in relation to the route of travel or traveling speed or direction of travel or the like. Furthermore, the method provided according to the present invention may advantageously serve to recognize a decalibration of the camera system that may possibly have occurred during the course of operation and to initiate recalibration of the camera system. Furthermore, the solution provided according to the present invention in an inexpensive manner can permit use of CE cameras or CE camera systems, since the safety devices or the qualifications of the image/camera signals are provided by the method proposed according to the present invention and accordingly do not have to be held in the camera or the camera system.

The method provided according to the present invention means that frozen images can be recognized, and further the image/camera signals at the time n and at the time n−1 can be compared with each other in the evaluation function, so that in particular objects suddenly appearing can be assessed in the evaluation function and if necessary marked as striking before being subjected to possible further data processing.

BRIEF DESCRIPTION OF THE DRAWINGS

Specific embodiments of the present invention will be discussed in greater detail with reference to the figures and the following description.

DETAILED DESCRIPTION

Figure 1:
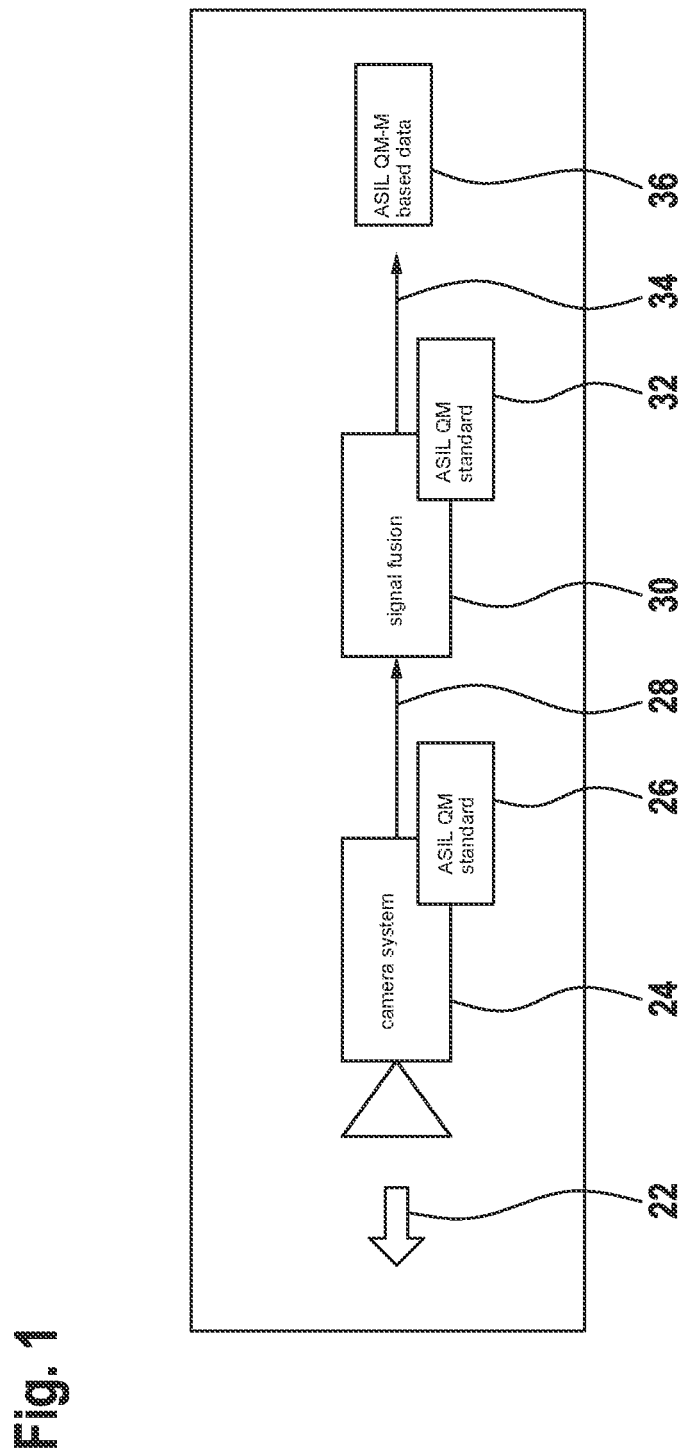
FIG. 1 schematically shows the illustration of a camera system without safety qualification of the image/camera signal.

The illustration according to FIG. 1 shows signal processing of image/camera signals 28 of a camera system 24 without a safety qualification. A wanted signal arriving at the camera system 24 is processed and sent as an image/camera signal 28, observing the ASIL QM standard 26. In the context of a signal fusion 30, fusion of the image/camera signal 28 with other signals from the surroundings takes place, observing the ASIL QM standard 32. From this, ASIL QM-based data are generated from an object list 34.

Specific Embodiments of the Present Invention

In the following description of the specific embodiments of the present invention, identical or similar elements are designated with identical reference numerals, repeated description of these elements being dispensed with in individual cases. The figures represent the subject of the present invention only schematically.

Figure 2:
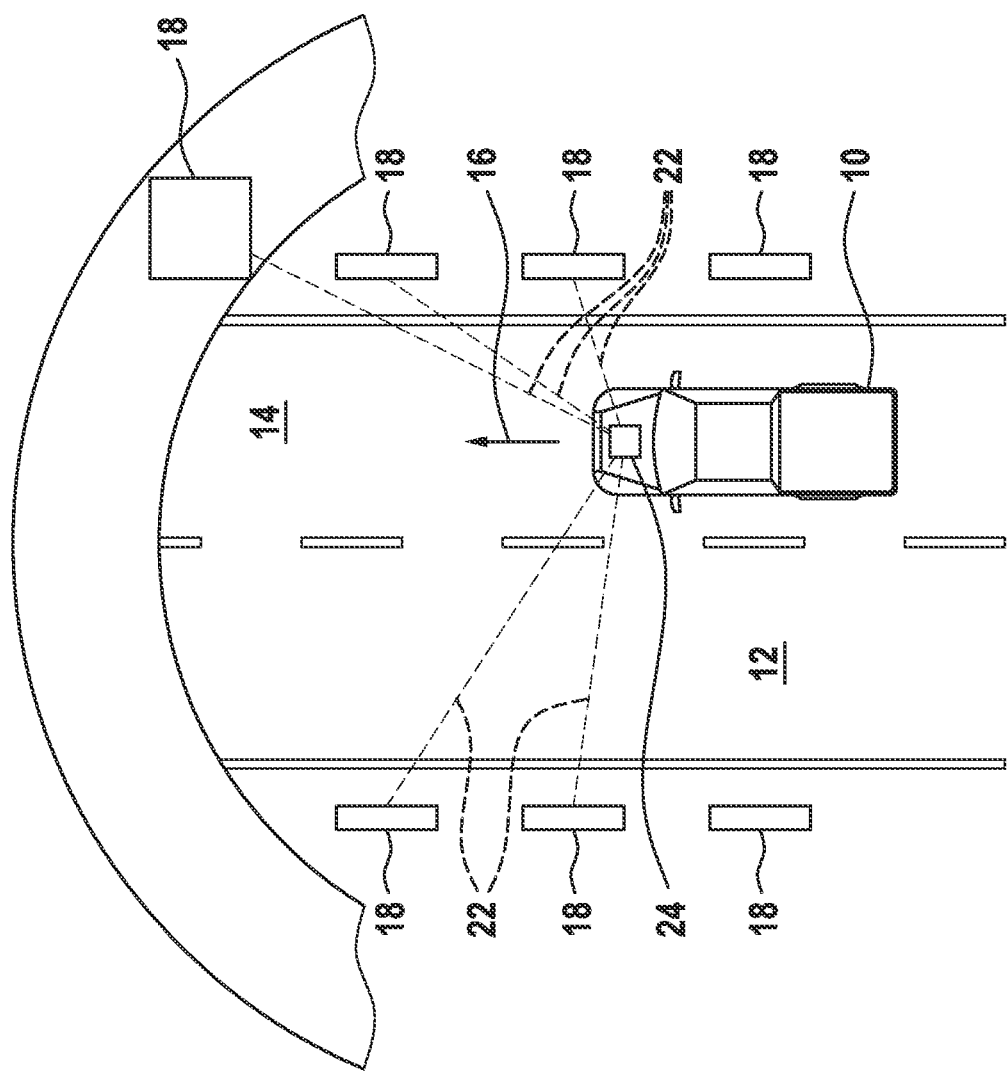
FIG. 2 shows an autonomously or partially autonomously driving vehicle with the vehicle's surroundings and infrastructure present in the vehicle's surroundings.

FIG. 2 shows a partially autonomously or autonomously driving vehicle 10 moving on a roadway 14 within the vehicle's surroundings 12. It is furthermore apparent from FIG. 2 that the partially autonomously or autonomously driving vehicle 10 is passing along a roadway 14, the vehicle 10 moving in the direction of travel 16 and passing for example through the entrance to a tunnel portion through which the roadway 14 on which the partially autonomously or autonomously driving vehicle 10 is traveling extends.

In the surroundings 12 of the partially autonomously or autonomously driving vehicle 10 there are components of an infrastructure that represent infrastructure information 18. These arrive as wanted signals 22 at a camera system 24 present in the partially autonomously or autonomously driving vehicle 10.

This is a camera system 24 that according to the present invention generates image/camera signals 28 that, as will be described below, are processed further in the context of a safety qualification. The camera or camera system 24 itself is a standard CE camera system or a CE camera.

The infrastructure information 18 that reaches the autonomously or partially autonomously driving vehicle 10 from outside, i.e. from the vehicle's surroundings 12, represents for example gantries, road signs, buildings, tunnels, railroad crossings, bridges, lane markings, masts or the like. In particular, the infrastructure information 18 is those components of the infrastructure, i.e. the vehicle's surroundings 12, that are static, i.e. represent fixed points.

Figure 3:
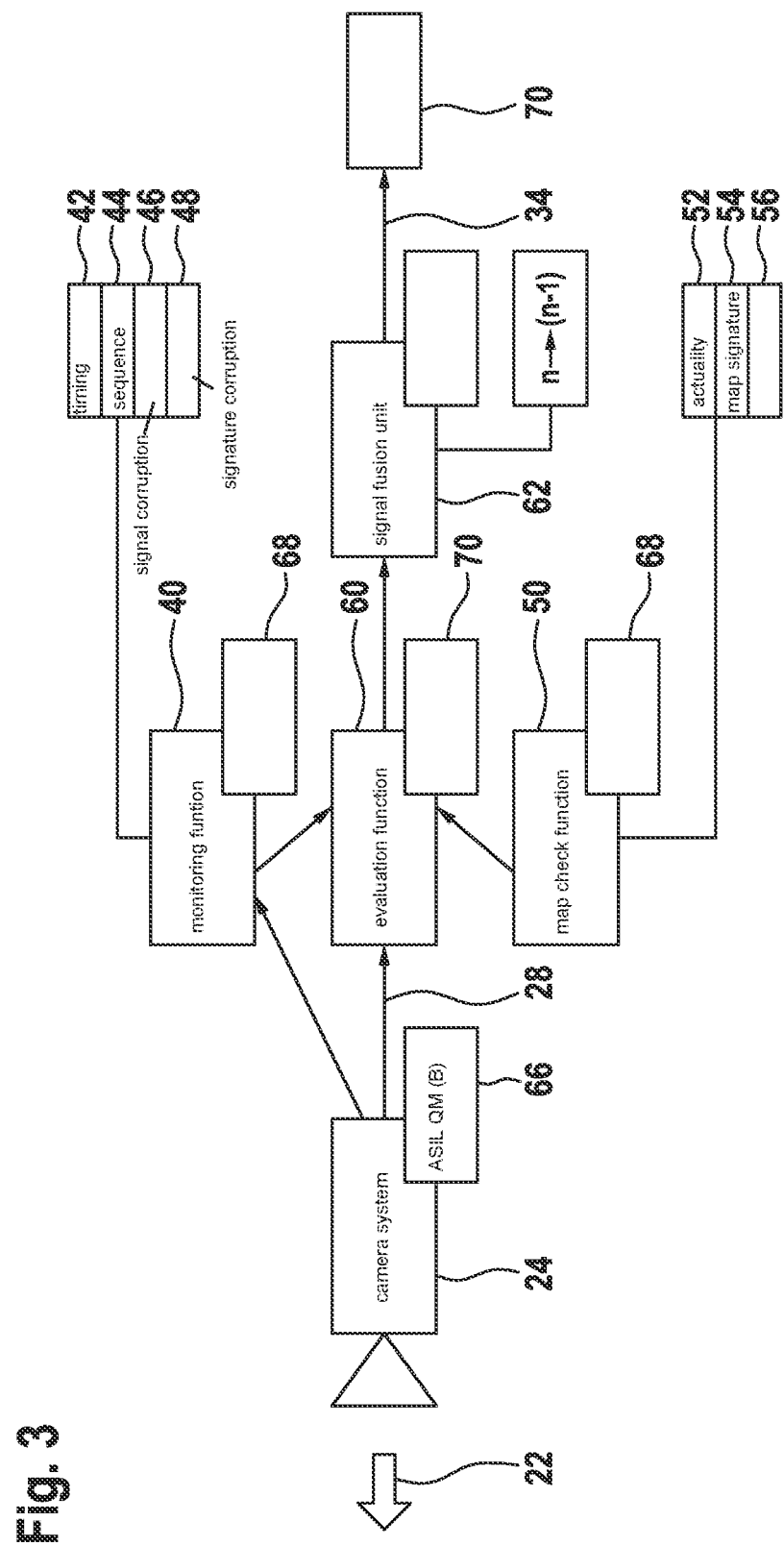
FIG. 3 schematically shows a camera system of an autonomously or partially autonomously driving vehicle, the image/camera signal of which is undergoing a safety qualification.

A safety qualification of image/camera signals 28 of a camera system 24, present as standard, with a CE camera or the like emerges from the schematic reproduction according to FIG. 3. Via the camera system 24, first of all the wanted signals 22 illustrated in FIG. 2 are received from the vehicle's surroundings 12, which signals represent the infrastructure information 18 that reaches the autonomously or partially autonomously driving vehicle 10 from outside. In the context of the camera system 24, the processing of the image/camera signals 28 takes place in accordance with ASIL QM (B) 66.

As furthermore emerges from the example system illustrated in FIG. 3 with a safety qualification for image/camera signals 28, the image/camera signals 28 are communicated to an evaluation function 60. Associated with the evaluation function 60 is at least a monitoring function 40 on one hand and a map check function 50 on the other hand.

In the context of the monitoring function 40, monitoring of the image/camera signals 28 takes place in that in the context of timing monitoring 42 monitoring is carried out as to whether the image/camera signals 28 of the camera system 24 are transmitted in an always recurring, known time window. In the context of sequence monitoring 44, in the context of the monitoring function 40 it is monitored whether the image/camera signals 28 are transmitted in the correct sequence (sequence monitoring). Furthermore, in the context of the monitoring function 40 it is monitored whether signal corruption 46 is present. The image/camera signals 28 transmitted from the camera system 24 may be corrupted, which can be found out by a CRC check (cyclic redundancy check, method for determining a test value for data in order to be able to recognize errors in transmission or storage. In an ideal case, the method may even correct the received data independently, in order to avoid repeated transmission) or a similar mechanism.

In addition, it is checked in the monitoring function 40 whether or not the signatures of the respective camera system 24 from which the image/camera signals 28 are transmitted are correct (security monitoring).

If all these monitoring steps with regard to timing monitoring 42, sequence monitoring 44, signal corruption 46 and signature corruption 48 are completed successfully, it is concluded that the image/camera signal 28 of the camera system 24 has been transmitted by the correct camera system 24 at the correct time in the correct sequence and with non-corrupted content. The correctness of the image recorded by the respective camera system 24 can however not be completely checked by this monitoring according to the monitoring function 40 alone. For this, the use of a map check function 50 is required. The map check function 50 is also referred to as MAP information. The map check function 50 includes actuality monitoring 52 and a map signature 54. Furthermore, continuous updating of static objects occurs in the context of the map check function 50. In the context of the map check function 50, significant static landmarks, significant buildings and the like in the form of gantries, road signs, houses, possibly even trees, which are used in the context of an evaluation function 60 for reconciliation with the image/camera signals 28, are marked in. In the context of the map check function 50, the recorded images, that is to say the image/camera signals 28, are verified using the map information. Thus it is made possible for a camera 24 to record an image that correctly images the surroundings. The map check function 50 as such is to be checked for its actuality. The update period may for example be of the order of days or weeks. As a rule, a weekly update is quite sufficient, since as a rule static objects do not change with respect to their location and their positioning. Furthermore, it should be checked to what extent the mapping signature 54 is current.

In the context of the evaluation function 60, the signals processed by the monitoring function 40 with regard to the above-mentioned criteria via qualified image/camera signals 28 and, for example by a signal fusion unit 62, are compared and merged with the static information, obtained from the map check function 50, from the vehicle's surroundings 12, that are represented by the infrastructure information 18. In the event of a fault, the subsequent processing system is informed immediately, so that faulty image/camera signals 28 do not continue to be processed and are discarded as "marked faulty" in a timely manner. The comparison of the infrastructure information 18 from the map check function 50 with the recorded images or the image/camera signals 28 of the camera system 24 takes place, in particular taking into account the static landmarks. If these marked points are also present in each image/camera signal 28 of the camera system 24 at identical, always recurring, correct points, it can be concluded that the camera system 24 is supplying a "correct" image. This circumstance of the method proposed according to the present invention can be utilized in that calibration of the camera system 24 can also be checked constantly online. If all the infrastructure information 18 representing static landmarks is shifted with an identical or similar vector, it is to be assumed that a decalibration of the camera system 24 is occurring, so it has to be re-calibrated for correct operation.

With the method provided according to the present invention, the particular case of a frozen image can also be recognized, this being done by correspondingly taking into account the sequence monitoring 44. In the case of always identical, recurring images at the times n and n−1, it is to be assumed that the camera system 24 is faulty. In the context of the evaluation function 60 that succeeds the camera system 24, in addition the image/camera signals 28 of the camera system 24 at the time n and at the time n−1 are compared with each other. Objects that suddenly appear during this comparison may if necessary be marked in the evaluation function 60 as "striking" and be taken into account accordingly.

This safety qualification of image/camera signals 28 of a conventional camera system 24 which is in the form of a software application permit the use of standard cameras and the qualification of their image/camera signals 28 in such a way that they meet the safety requirements in accordance with ASIL A-D or SIL 1-3.

By applying the method provided according to the present invention in a VCU of a partially autonomously or autonomously driving vehicle 10, at particularly challenging points, such as for example tunnel entrances or building sites, infrastructure information 18 from outside of the autonomously or partially autonomously driving vehicle 10 can be transmitted into the autonomously or partially autonomously driving vehicle 10, since this as a rule is equipped with a CCU or other radio unit. This information from outside of the partially autonomously or autonomously driving vehicle 10, coming from the vehicle's surroundings 12, can support a corresponding vehicle 10 and guide it accordingly. Due to the infrastructure information 18 from the vehicle's surroundings 12, safety-critical functions within the partially autonomously or autonomously driving vehicle 10 can be supported or simply made possible. As a rule, the information transmitted into the vehicle from outside of the autonomously or partially autonomously driving vehicle 10 is communicated via direct wireless communication, for example in accordance with standards DSRC/ITS G5 or cellular V2X, LTE-V, 5G-V2X, or similar.

The present invention is not limited to the embodiments described here and the aspects emphasized therein. Rather, a multiplicity of modifications that fall within the scope of standard practice in the art are possible within the range of the present invention.

What is claimed is:

1. A method for qualification of a camera system and/or image/camera signals of the camera, of a partially autonomously or autonomously driving vehicle using infrastructure information of a vehicle's surroundings, the method comprising the following steps:
   a) monitoring the image/camera signals of the camera system by a monitoring function with regard to at least the following criteria:
      whether the image/camera signals are transmitted in recurring, known time windows,
      a sequence of the image/camera signals,
      corruption of the image/camera signals,
      signature checking of the camera system;
   b) checking the image/camera signals using unmoving land markings that are reconciled with a list;
   c) communicating the image/camera signals according to a) and the infrastructure information contained in an updated map check function according to b) to an evaluation function and comparing them in a signal fusion unit; and
   d) obtaining qualified image/camera signals after carrying out c).

2. The method as recited in claim 1, wherein when it is established that the image/camera signal recurs in the recurring known time window of the image/camera signal that is established according to a), in a correct sequence of the image/camera signals, with non-corrupted image/camera signals and a correct camera system, it is concluded that a transmission of an image/camera signals from the camera system are in the correct sequence at the correct time and with non-corrupted contents has occurred.

3. The method as recited in claim 1, wherein according to method step c) all the image/camera signals and the infrastructure information are evaluated in the evaluation function and, in the event of a fault, it is concluded that the image/camera signals are faulty.

4. The method as recited in claim 1, wherein according to method step c) a comparison of the infrastructure information with the image/camera signals with regard to visibility of the infrastructure information in the image/camera signals is carried out.

5. The method as recited in claim 4, wherein for each of the image/camera signals that has matching points of visible infrastructure information, it is concluded that the image/camera signal is correct.

6. The method as recited in claim 5, wherein according to method step c) within the evaluation function, the image/camera signals at a time (n) and at a time (n−1) are compared.

7. The method as recited in claim 1, wherein according to method steps a) and c), the evaluation function monitors the image/camera signals for an occurrence of a frozen image.

8. The method as recited in claim 1, wherein upon the comparison according to method step c) being performed and a shift of the infrastructure information by an identical vector being detected, it is concluded that the camera system has been decalibrated.

9. The method as recited in claim 1, wherein according to b) the unmoving land markings in the infrastructure information includes information on
   gantries,
   road signs,
   buildings,
   tunnels,
   railroad crossings,
   bridges,
   lane markings,
   guardrails,
   transmitter masts.

10. The method as recited in claim 1, wherein the method is used for guiding and supporting an autonomously or partially autonomously driving vehicle using infrastructure information from outside of the vehicle at critical points.

* * * * *